United States Patent
van Heyden et al.

(10) Patent No.: US 6,541,888 B2
(45) Date of Patent: Apr. 1, 2003

(54) WINDING BODY FOR RECEIVING A WINDING FOR AN ELECTROMAGNETOMECHANICAL CONVERTER AND ELECTROMAGNETOMECHANICAL CONVERTER

(75) Inventors: Marcus van Heyden, Schweinfurt (DE); Horst Oppitz, Dittelbrunn (DE); Jens Baumeister, Schweinfurt (DE); Edmund Grau, Poppenhausen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/766,080

(22) Filed: Jan. 19, 2001

(65) Prior Publication Data

US 2001/0011854 A1 Aug. 9, 2001

(30) Foreign Application Priority Data

Jan. 21, 2000 (DE) .......................... 100 02 485

(51) Int. Cl.⁷ ..................... H02K 1/00; H02K 15/04
(52) U.S. Cl. ............... 310/214; 310/194; 310/179; 310/103; 310/256; 310/52; 310/71
(58) Field of Search ........................ 310/214

(56) References Cited

U.S. PATENT DOCUMENTS

| 4,818,911 A |   | 4/1989 | Taguchi et al. ............. 310/259 |
| 5,220,229 A | * | 6/1993 | Heim .......................... 310/260 |
| 5,321,572 A |   | 6/1994 | Shibui et al. ................. 361/38 |
| 5,331,246 A | * | 7/1994 | Baronsky ..................... 310/194 |
| 5,698,923 A |   | 12/1997 | Scherzinger et al. |
| 6,265,805 B1 | * | 7/2001 | Deblesr ....................... 310/261 |

FOREIGN PATENT DOCUMENTS

| DE | 87 864 | 11/1972 |   |
| DE | 41 42 180 | 7/1993 |   |
| DE | 299 08 718 | 9/1999 |   |
| EP | 863 601 | 9/1998 |   |
| JP | 63-16419 | 2/1988 | ........... H01F/27/40 |
| JP | 4-17541 | 1/1992 | ............ H02K/1/16 |

OTHER PUBLICATIONS

Patent Abstracts of Japan, vol. 1996, No. 12, Publication No. 08223843.
Patent Abstracts of Japan, vol. 1999, No. 4, Publication No. 11018331.

* cited by examiner

Primary Examiner—Nestor Ramirez
Assistant Examiner—I A Mohandesi
(74) Attorney, Agent, or Firm—Cohen, Pontani, Lieberman & Pavane

(57) ABSTRACT

A winding body has a winding area (31) for a winding (13), which winding area (31) is formed by a winding carrier (32) and two legs (34, 35) which define the winding area (31) in axial direction (L) and are connected with the winding carrier (32). The winding carrier (32) has a locking device (40) for locking the winding body (30) at a winding tooth (24). Further, a temperature sensor (50) for measuring the temperature in a coil (25) can be provided in the winding body (30). The winding body (30) has a receiving area (36) for a connection device (70) for the windings (13), wherein the receiving area (36) is formed by one of the legs (35), an elongation area (33) of the winding carrier (32) extending beyond this leg (35), and a fixing leg (60) at a distance from the leg (35).

12 Claims, 5 Drawing Sheets

WINDING BODY FOR RECEIVING A WINDING FOR AN ELECTROMAGNETOMECHANICAL CONVERTER AND ELECTROMAGNETOMECHANICAL CONVERTER

BACKGROUND OF THE INVENTION

1. Field of the Invention

The present invention is directed first to a winding body for receiving a winding for an electromagnetomechanical converter with a winding area for the winding, which winding area is formed by a winding carrier and two legs which define the winding area in axial direction and are connected with the winding carrier.

2. Discussion of the Prior Art

Electromagnetomechanical converters are rotating electric machines which, with the aid of a magnetic field, either convert electrical energy into mechanical energy according to the motor principle or convert mechanical energy into electrical energy according to the generator principle.

Electric machines of this kind which can be constructed, for example, as synchronous machines or asynchronous machines have a stationary part, referred to as the stator, and a rotating part called the rotor. Depending on the type of construction of the electric machine, the rotor and stator are generally formed of a lamination stack comprising a yoke and a quantity of winding teeth. An electric winding (coil) is arranged in the slots between these winding teeth. When current flows through these windings, the magnetic field of the electric machine is generated.

The windings are associated with individual strands, wherein the windings assigned to a common strand are connected with one another. In the case of three-phase machines, a total of m strands are provided, wherein current is applied with a phase offset of 360/m.

The lamination stack with its electromagnetic components is generally referred to as a magnetic circuit. For example, the lamination stack can be constructed in one part, which means that the yoke and the winding teeth are constructed as an individual structural component part. In other known magnetic circuit designs, the lamination stacks are constructed in two parts. This means that the yoke as well as the individual winding teeth are initially produced as separate structural component parts and are subsequently combined to form a common lamination stack.

The use of winding bodies for producing the windings and fastening them to the winding teeth is already known. A known winding body developed by the present Applicant which has the features described above is shown and described in FIG. 2.

In the case of one-part lamination stacks, two winding bodies are clamped into a winding machine and then wound with the winding. Particularly in electric machines with small lengths, the winding can be removed from the winding machine after being produced and can be placed on the respective teeth of the lamination stack.

With two-part lamination stacks, the winding bodies can first be connected with a winding tooth and inserted into the winding machine in this combination. Winding is then carried out with the result that a coil is formed by the winding tooth, the two winding bodies and the actual winding. The coil produced in this way can subsequently be connected with the yoke. However, the winding can also be produced in the manner described with respect to the one-part lamination stack.

As soon as the respective winding ends have been connected in the desired manner, the stator or rotor of the electric machine is finished.

In connection with the production of electromagnetomechanical converters and particularly the windings provided therefor, there is a need to accomplish this in ever more economical fashion while enhancing quality at the same time.

A first step in this direction was realized in general by the introduction of winding bodies. This will be explained briefly by an example. In one-part lamination stacks, it was formerly necessary to place the individual windings between the slots of the winding teeth by hand. In terms of manufacturing techniques, this is time-consuming and very cost-intensive. Through the use of winding teeth, it is now possible for the winding to be wound outside the lamination stack by machine. For one, this reduces costs considerably. Further, it results in qualitative advantages because up to 15 per cent more copper can be introduced into the slot by the mechanical winding process.

When the windings are provided for a one-part lamination stack, the winding teeth generally have no tooth head. A tooth head of this kind is generally formed at the free end of the winding tooth remote of the yoke, and the tooth head has a greater width than the actual winding tooth. The winding can be prevented from accidentally slipping off the winding tooth by means of the tooth head which, among other things, takes on electromagnetic functions. Therefore, insofar as the winding teeth have no tooth head of this kind, there is a risk that the winding can accidentally slip off the winding teeth and, therefore, off the lamination stack.

Further, considerable effort has been expended in recent times to simplify the wiring connection of the individual windings. Formerly, in order to connect the windings it was necessary for the respective ends of the windings forming a phase to be assembled and wired by hand. Subsequently, the winding strands formed in this way had to be insulated from one another and taped. This kind of connection was felt to be very disadvantageous because, on the one hand, it was very cumbersome and time-consuming and, on the other hand, very cost-intensive. Further, the guiding and supporting of strands which were formed in this way and guided to the individual lead connections required a great deal of space.

In order to avoid these disadvantages in construction, annular connection elements or connecting rings were developed; the connection rings are insulated from one another and the ends of the individual windings are fastened to them. It must be possible to fasten these connection elements suitably in a simple, safe and, above all, space-saving manner, which could not be satisfactorily accomplished heretofore.

SUMMARY OF THE INVENTION

Proceeding from the prior art mentioned above, it is the object of the present invention to provide winding bodies for a winding and an electromagnetomechanical converter by which the changing requirements for the construction design of the electromagnetomechanical converter that were described above can be taken into account. In particular, solutions are provided by which the disadvantages and problems described above can be avoided.

First, different variants for winding bodies will be suggested for meeting this object. The individual winding bodies according to the respective aspects of the solution have features that are known from the prior art, namely, from the winding bodies described in the introductory part.

First, the winding body has a winding area for the winding, which winding area is formed by a winding carrier and two legs which define the winding area in axial direction and are connected with the winding carrier. This winding area is accordingly limited on three sides. During the winding process, the winding is placed in this winding area. In order to prevent the winding from slipping out of the winding area, the legs are preferably constructed in such a way that they project over the winding carrier. In this way, they take on the function of end plates of a kind for the winding area against which the winding can be supported.

The various aspects of the solution have features, according to the invention, which satisfy the changing and increasing requirements for the winding body and electromagnetomechanical converter.

According to a first aspect of the solution of the invention, the winding carrier has a locking device for locking the winding body at a winding tooth. By means of this aspect of the solution, the winding is prevented from accidentally slipping off the winding tooth. The basic idea of this aspect of the solution is that each winding body has a corresponding locking device by which it can be connected with the respective winding tooth. The invention is not limited in this regard to determined types of locking devices. It is important only that the winding body can be held securely at the winding tooth by means of the locking device. A non-exclusive example for an advantageous locking device is described in greater detail in the course of the description.

The winding can be prevented from slipping, chiefly radially outwardly, by the locking device according to the invention. At the same time, the winding is fixed in the slot in this way, so that no slot cover slides or slot wedges are needed with short active lengths. Slot inserts or wedges of this type were formerly necessary so that windings which were wound on the winding teeth or attached to the latter without winding bodies were prevented from slipping out of the slots of the lamination stack. The slot wedges are placed on the windings from the outside after winding. However, the use of such slot wedges, particularly the fastening of the slot wedges, is very uneconomical. An example of such slot wedges is described in connection with FIG. 1.

According to a second aspect of the solution, a temperature sensor for measuring the temperature in a coil is provided in the winding body.

The basic construction of this winding body according to the invention corresponds to that of the winding body described in the first variant of the solution; accordingly, reference is had to the preceding remarks with respect to its construction.

Temperature sensors are very important for electromagnetomechanical converters because the actual temperature can be monitored in this way. When the windings are arranged on a lamination stack forming the stator, for instance, and the temperature in the rotor is to be determined, this is possible only with great difficulty by a direct route because of the rotating rotor. Therefore, the rotor temperature must be determined by an indirect route. This is carried out by means of corresponding temperature sensors arranged inside the winding heads. The stator temperature can be derived from the temperature measured in this way and the rotor temperature can, in turn, be derived from the stator temperature.

When the electromagnetomechanical converter is used as a rotary current machine or three-phase machine, for example, it has three phases, wherein each phase can have, for example—but not exclusively—six windings. With a configuration of this kind, it may be advantageous to provide a temperature sensor in each phase, so that a converter of this kind has a total of three temperature sensors. However, the quantity of necessary temperature sensors is not limited to this specific number. One to three such temperature sensors can advantageously be provided for each converter, wherein the quantity of temperature sensors can also vary depending on need and specific application.

The arrangement of the temperature sensor or temperature sensors inside the winding body, according to the invention, has a number of advantages. Previously, it was necessary to position the temperature sensors directly on or in the winding, for example, by winding them in along with the winding. This was disadvantageous in that it made the production of the winding very complicated and, moreover, the temperature sensors could be damaged during the winding process.

The arrangement of the temperature sensor, for example, an NTC temperature sensor, inside the winding body protects the temperature sensor during the winding process and, when suitably arranged, ensures that the temperature sensor can be brought into contact with the winding (the copper) in a defined manner during subsequent operation. A non-exclusive example of how the temperature sensor can be arranged inside the winding body is explained more fully in the course of the description.

According to a third aspect of the solution, a receiving area for a connection device for the winding is formed by one of the legs, an extension of the winding carrier extending beyond this leg, and a fixing leg which is provided at a distance from the leg in axial direction and connected with the extension of the winding carrier.

By means of a winding body according to the invention which is constructed in the manner described above, it is possible to fasten a connection device in a simple and space-saving manner. In terms of basic construction, the winding body again corresponds to the two variants mentioned above, so that reference is had to the preceding comments in this respect. By constructing another receiving area which is preferably formed adjacent to the winding area, it is possible for the connection device which can be constructed in the form of connecting rings, for example, to be held in a simple but reliable manner. The receiving area formed in this way accordingly has the characteristic of receiving the connection device serving to connect the electromagnetomechanical converter and to hold it during the wiring or connection process as well as during subsequent operation.

Through the use of the winding body according to the invention, the winding can initially be produced externally by machine in accordance with the respective slot geometry that is desired and can subsequently be fixed in a suitable manner to the electromagnetomechanical energy converter. Fixing can mean the construction arrangement of the windings at the winding teeth or in the slots between the winding teeth as well as the connection thereof.

The winding carrier can advantageously have a locking device for locking the winding body at a winding tooth. A locking device of this kind is advantageously provided for the second and third aspects of the solution. Regarding their advantages, actions and results, reference is had to the remarks concerning the first aspect of the solution.

A temperature sensor for measuring the temperature in the coil can advantageously be provided in the winding body.

This feature can be realized in the winding body according to the first and third aspects of the solution. The advantages, actions and effects are described with reference to the second variant of the solution.

In a further construction, the winding carrier can have an elongation area projecting beyond at least one of the legs. An elongation area of this kind is advantageously employed in connection with the first and second variants of the solution. The elongation area serves to receive the connection device. If the connection of the individual windings is to be carried out by a corresponding wiring of the individual winding ends in previously known manner, the wiring strands formed in this way which are suitably insulated and taped can be held in the elongation area.

However, if the connection device is constructed in the form of connecting rings or the like, the receiving area for a connection device of this kind for the winding can preferably be constructed in such a way that the receiving area is formed by one of the legs, an elongation area of the winding carrier extending beyond this leg, and a fixing leg which is provided at a distance from the leg in axial direction and is connected with the winding carrier. With regard to the advantages, actions and effects of this embodiment form, reference is had to the remarks made with respect to the third variant of the solution.

The variants of the solution according to the invention which were described above can be combined with one another in any way. For example, it is possible to combine any two of the above-mentioned variants. In a particularly advantageous constructional variant, a winding body can be provided which combines the features of all three variants of the solution.

The locking device can advantageously have a locking plate which is pivotable in a cutout provided in the winding carrier. The locking plate is fixed to the winding carrier by one end. A locking projection or lug is provided at its other end. A locking device constructed in this manner functions according to the spring principle, for example. In the neutral spring state, the locking plate can be arranged in the corresponding cutout in such a way that the locking lug projects over the winding carrier. When the winding body is fastened to a winding tooth, the locking plate is first pressed into the cutout in the winding carrier. In this state, the winding body is connected with the winding tooth. Because of the restoring forces in the locking plate, the locking plate can pivot into its normal position as soon as the locking lug has reached a recess in the winding tooth into which it can move. A secure connection can be produced between the winding body and the winding tooth by means of a locking connection of this type, so that the winding body is reliably prevented from accidentally slipping off the winding tooth, particularly in radial direction.

The temperature sensor can preferably be arranged in at least one of the legs, preferably in a cutout provided in the leg. In this way, the temperature sensor can be arranged in the winding body in a particularly simple manner. The winding body which is preferably made of plastic can be produced by a suitable method such as injection molding or the like. A corresponding cutout for the temperature sensor can easily be provided in the winding body, for example, in one of its legs, during manufacture. In this case, the temperature sensor is introduced into the cutout at the start of the winding process. The winding can then be produced, wherein the temperature sensor is reliably protected against damage in the cutout. Further, by means of a suitable selection of the cutout geometry, the temperature sensor contacts the fully wound winding in a defined manner so that the temperature in the coil can be accurately determined and transmitted.

However, the invention is not limited to this specific example. It is also possible, for example, to arrange the temperature sensor in the winding body in a different manner. This can be carried out, for instance, by casting the temperature sensor in the winding body or the like.

One or more channels or ducts can preferably be provided in the leg, through which the contacts of the temperature sensor can be guided. The contacts of the temperature sensor are inserted into and guided through these ducts which, for example, can be oriented radially outward in the legs. In this way, the temperature sensor can be connected in a simple manner with corresponding lines leading to a suitable control device or evaluating device. Naturally, it is also possible to guide the contacts of the temperature sensor out of the winding body in another way. It is possible, for example, to cast the contacts in the winding body together with the temperature sensor during production of the winding body.

The fixing leg can preferably have, at its free end, a holding element which projects into the receiving area. In this regard, the end located opposite from the end by which the fixing leg is attached to the winding carrier is designated as the free end of the fixing leg. In this case, the fixing leg can again function according to the spring plate principle. While the connection device is arranged inside the receiving area, the fixing leg can be bent outward, for example, enabling a particularly simple arrangement of the connection device inside the receiving area. Due to the restoring forces occurring when bending the fixing leg, the latter tends to move back into its initial position. Insofar as this takes place, the connection device is securely held in the receiving area by the holding element which projects into the receiving area and which can be constructed as a lug, so that unintentional detachment of the connection device from the receiving area is reliably prevented.

In a further construction, at least one of the legs and/or the fixing leg can have one or more cutouts or shaped out portions for fixing. These cutouts or shaped out portions can serve to receive corresponding tapes by which the individual windings or winding heads can be securely fastened to the yoke.

The winding carrier and/or at least one of the legs can preferably have at least one recess for holding an insulation layer. The purpose of the insulation layer, which can be constructed as insulating paper or the like, for example, is to insulate the winding. This insulating material must be held during the winding process in such a way that it does not slip, for one, and, secondly, does not lead to tilting or the like during the winding process. For this purpose, individual edges of the winding carrier and/or the legs can have corresponding recesses, for example. These recesses can be constructed in the form of a step-shaped shoulder, for example, wherein the height of the shoulder roughly corresponds to the thickness of the insulation layer, for example, a slot insulation paper.

The legs and/or fixing leg can advantageously be constructed vertical to the winding carrier. This results in a substantially U-shaped winding area and/or receiving area. However, it is also possible that the legs are oriented to the winding carrier at another angle.

According to a second aspect of the present invention, an electromagnetomechanical converter is provided which has a rotor and a stator, wherein the rotor or stator has at least one lamination stack with a yoke and a quantity of winding teeth for receiving windings. Every winding of the electromagnetomechanical converter is wound on two of the above-described winding bodies according to the invention.

In this way, it is possible that the windings are initially wound separately on a winding machine provided exclusively for this purpose and can subsequently be connected with the lamination stack. This connection can be carried out in optimal manner with respect to the requirements mentioned above, so that the windings are fixedly connected with the lamination stack. Further, the connection device for the individual windings can be arranged in the electromagnetomechanical converter in a space-saving manner. With regard to the advantages, actions, effects and manner of operation of the converter according to the invention, reference is had to the preceding remarks regarding the winding bodies according to the invention in their entirety.

The electromagnetomechanical converter can have a one-part lamination stack as well as a two-part lamination stack.

The winding bodies can advantageously be arranged at the end sides of the winding teeth. When the lamination stack is constructed in one part, the winding is initially produced separately and then placed on the winding teeth. In the case of a two-part construction of the lamination stack, the winding body can initially be arranged at the end sides of the winding teeth. The winding is subsequently wound directly on the winding teeth, so that a winding head is formed which can then be connected in its entirety to the yoke of the lamination stack in a simple manner.

A receiving device for the locking device of the winding bodies can preferably be provided at the end sides of the winding teeth. Depending on the construction of the locking device, this receiving device can be constructed in various ways, so that the invention is not limited to determined embodiment forms. When a locking plate with corresponding locking lug is provided as locking device of the winding bodies, the receiving device provided in the winding teeth is preferably constructed as a recess and the locking nose can snap into this recess. This provides a reliable and sturdy connection between the winding body and winding tooth. In particular, such a connection prevents the winding from accidentally sliding off the winding tooth radially.

Every winding is preferably enclosed by an insulation layer, for example, a slot insulation paper.

The connection device can advantageously have one or more connecting rings, preferably three connecting rings. The connecting rings are connection conductors which are constructed as ring conductors and are electrically insulated with respect to one another. The individual winding ends of the windings are connected, e.g., soldered, with the connection conductors so that uneconomical individual connection of the individual windings, as was described above, is avoided.

In a further construction, every winding body can be arranged at the end sides of the winding teeth in such a way that the receiving area for the connection device is constructed radially below the winding area for the winding viewed from the center of the yoke. In this way, the connection device is not arranged in front of the windings in axial direction. Rather, the connection device, for example, the connecting rings, is arranged coaxial to the windings below and/or inside the latter. The required installation space for the electromagnetomechanical converter can be reduced in this way.

The electromagnetomechanical converter can be a synchronous machine, for example, and, in this case, can be a permanently excited synchronous machine in particular.

The invention is explained more fully by embodiment examples with reference to the accompanying drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
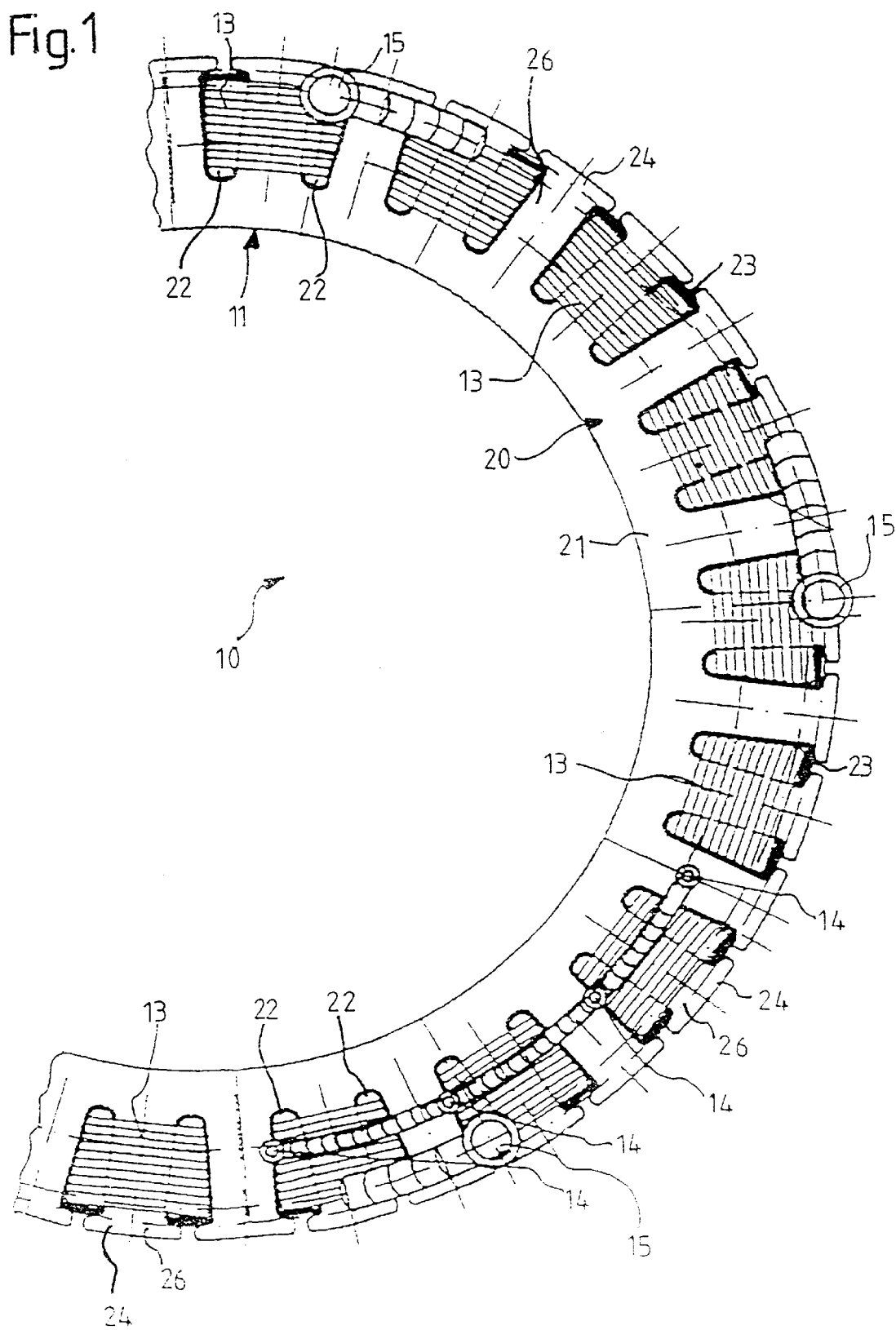
FIG. 1 is a schematic view showing an example for a lamination stack with corresponding windings as is known from the prior art.

FIG. 1 shows, first, a partial area of an electromagnetomechanical converter 10 constructed as a permanently excited synchronous machine. The partial area of the stator 11 shown in FIG. 1 serves for an overview of how the individual elements are arranged in relation to one another. This stator 11 is a variant of the solution as is already known from the prior art. The stator 11 has a one-part lamination stack 20 which is formed from a yoke 21 and a quantity of winding teeth 24.

Some of the winding teeth 24, in the present example, every second winding tooth 24, carry an electrical winding 13. In the example according to FIG. 1, no winding bodies have been inserted, so that the windings 13 must be manually inserted in corresponding slots 22 around the winding teeth 24. The windings 13 are associated with individual strands, wherein the windings associated with a common strand are connected. With a three-phase machine, the stator 11 has three strands to which current is applied at a 120-degree phase offset. The individual strands are formed by the ends 16 (FIG. 4) of the windings 13 which are guided together in a corresponding manner. The individual strands are guided to corresponding lead connections 15. A number of temperature sensors 14 are provided in order to measure the heat occurring in the stator during operation of the electric machine 10.

Corresponding slot wedges 23 are provided to prevent the windings 13 from slipping out of the slots 22 unintentionally; these slot wedges 23 are made of paper and are attached to the windings from the outside at the conclusion of the winding process. The slot wedges 23 form a mechanical resistance which should prevent the windings 13 from moving outward unintentionally in radial direction—considered from the yoke 21.

The one-part embodiment form of the lamination stack 20 shown in FIG. 1 has the disadvantages described above in connection with the prior art. In order to avoid these disadvantages, the winding 13 can be wound on corresponding winding bodies 30.

Figure 2:
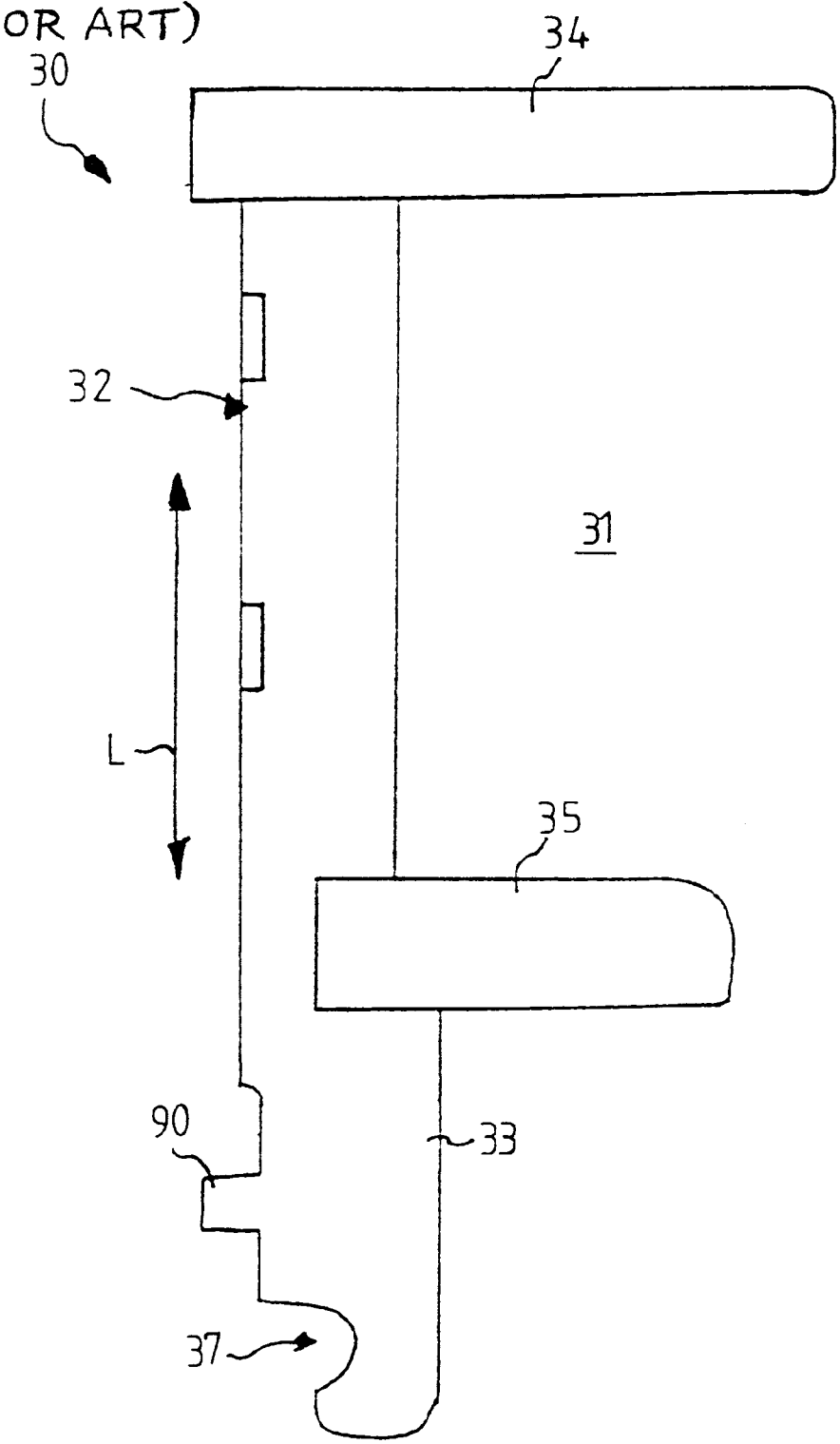
FIG. 2 is a schematic side view showing a winding body known from the prior art.

The winding body 30 shown in FIG. 2 has a winding area 31 for the winding 13 which is formed by a winding carrier 32 and two legs 34, 35 which define the winding area 31 in axial direction L and are connected with the winding carrier 32. The winding body 30 further has an elongation area 33 which extends beyond the legs 35. This elongation area 33 serves to receive the respective connection devices. In the embodiment according to FIG. 1, these connection devices are the ends 16 of the windings 13 which are combined to form strands and have been insulated and then taped. In order to secure the taping, cutouts 37 are provided in the winding carrier 32 for this purpose. The winding body 30 is fixed to a winding tooth, not shown, via a rigid fixing nose 90. However, the known winding body 30 shown in FIG. 2 cannot satisfy the changing and increasing requirements described above for winding bodies of this type. But these requirements can be met by a winding body 39 according to the invention as shown in FIGS. 3 to 6.

Figure 3:
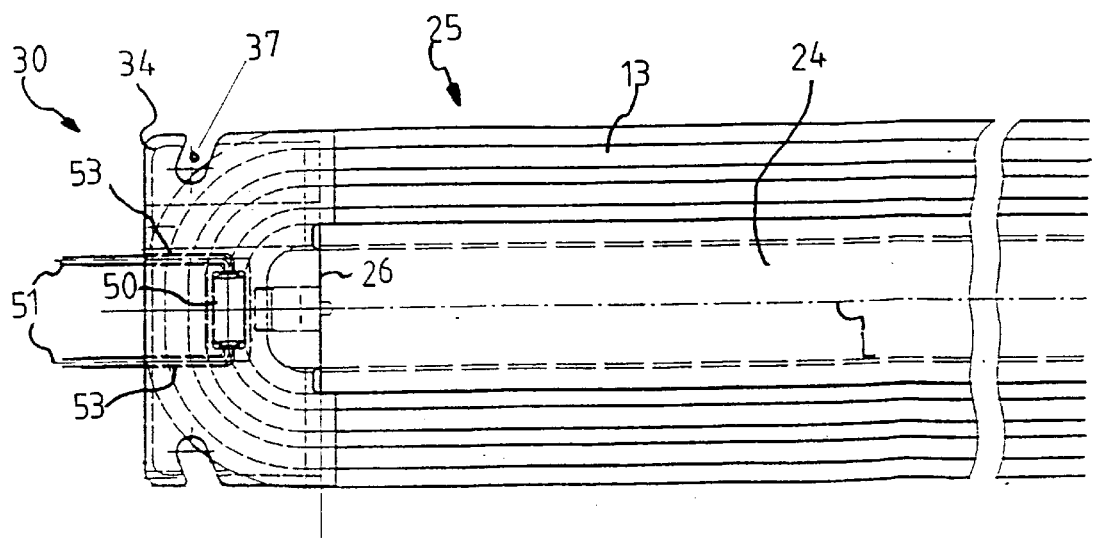
FIG. 3 shows a top view of a coil with a winding body according to the invention.

FIG. 3 shows a top view of a complete coil 25. It 25 comprises a winding tooth 24, a winding 13 and two winding bodies 30 arranged at either end side 26 of the winding tooth 24.

Figure 4:
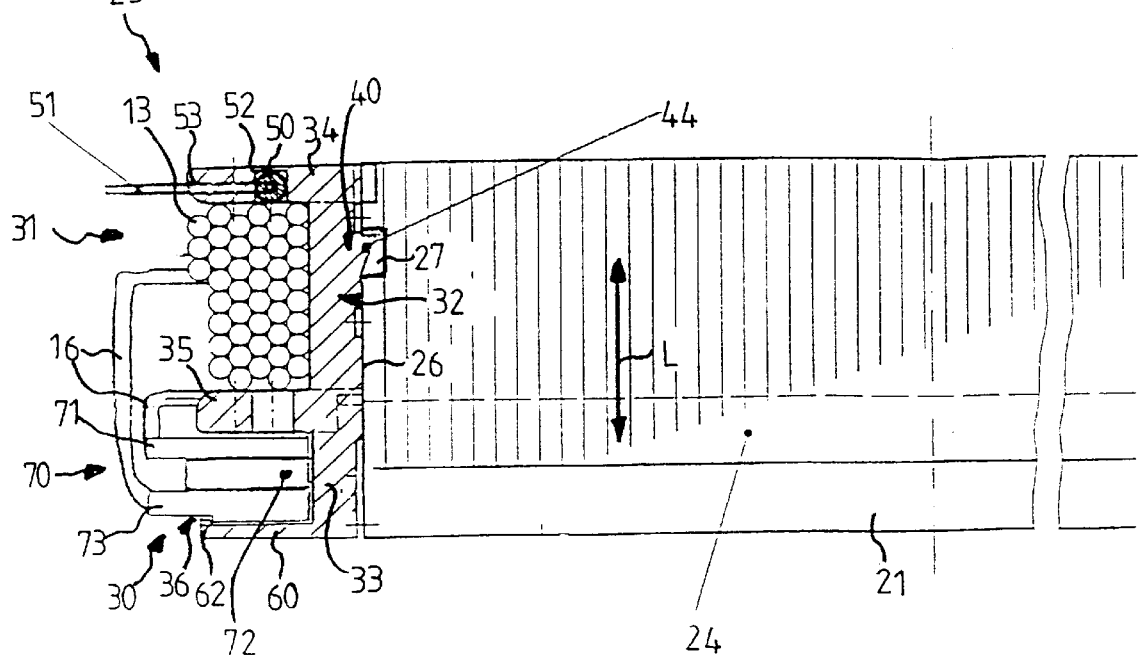
FIG. 4 shows a side view of the coil shown in FIG. 3.

As will also be seen from FIG. 4 in particular, the winding tooth 24 is fastened to the yoke 21. When the lamination stack 20 is constructed in one part, the winding tooth 24 can be connected with the yoke 21 in one part. In a two-part construction of the lamination stack 20, the winding teeth 24 are first produced separately and are then connected with the yoke 21. In order to produce the winding 13 which can initially be carried out in a separate winding machine, the winding bodies 30 are clamped into a corresponding holding device (not shown) in the one-part construction of the lamination stack 20, while they can be clamped into a corresponding holding device together with the winding tooth 24 in a two-part a construction of the lamination stack 20. The winding 13 is subsequently wound mechanically.

In this connection, the winding 13 is arranged in the winding area 31 formed by the winding carrier 32 and the two legs 34, 35. The legs 34, 35 define the winding area 31 in axial direction L and are connected with the winding carrier 32 in such a way that they project away from the latter vertically. An approximately U-shaped winding area 31 is formed in this way.

In order to be able to determine the temperature in the coil 25 and, based on knowledge of this temperature, to determine the temperature of the stator and subsequently also the temperature of the rotor, a temperature sensor 50 is arranged in a cutout 52 in the leg 34. In this way, the temperature sensor 50 is protected during the winding process. At the same time, the temperature sensor is connected in a defined manner with the winding 13 (the copper) after the winding 13 is produced, so that an accurate temperature measurement is possible. In order to be able to further process the values measured by the temperature sensor 50 in a control device or evaluating device, not shown, the temperature sensor 50 has one or more contacts 51 which are connected with the control or evaluating device via corresponding lines. In the embodiment example shown in the drawing, these contacts 51 are guided through corresponding ducts formed in the leg 34. However, it is also possible for the temperature sensor 50 and contacts 51 to be molded in the leg 34 of the winding body 30 because the latter is preferably made of plastic and can accordingly be produced by means of an injection molding process or the like.

Figure 5:
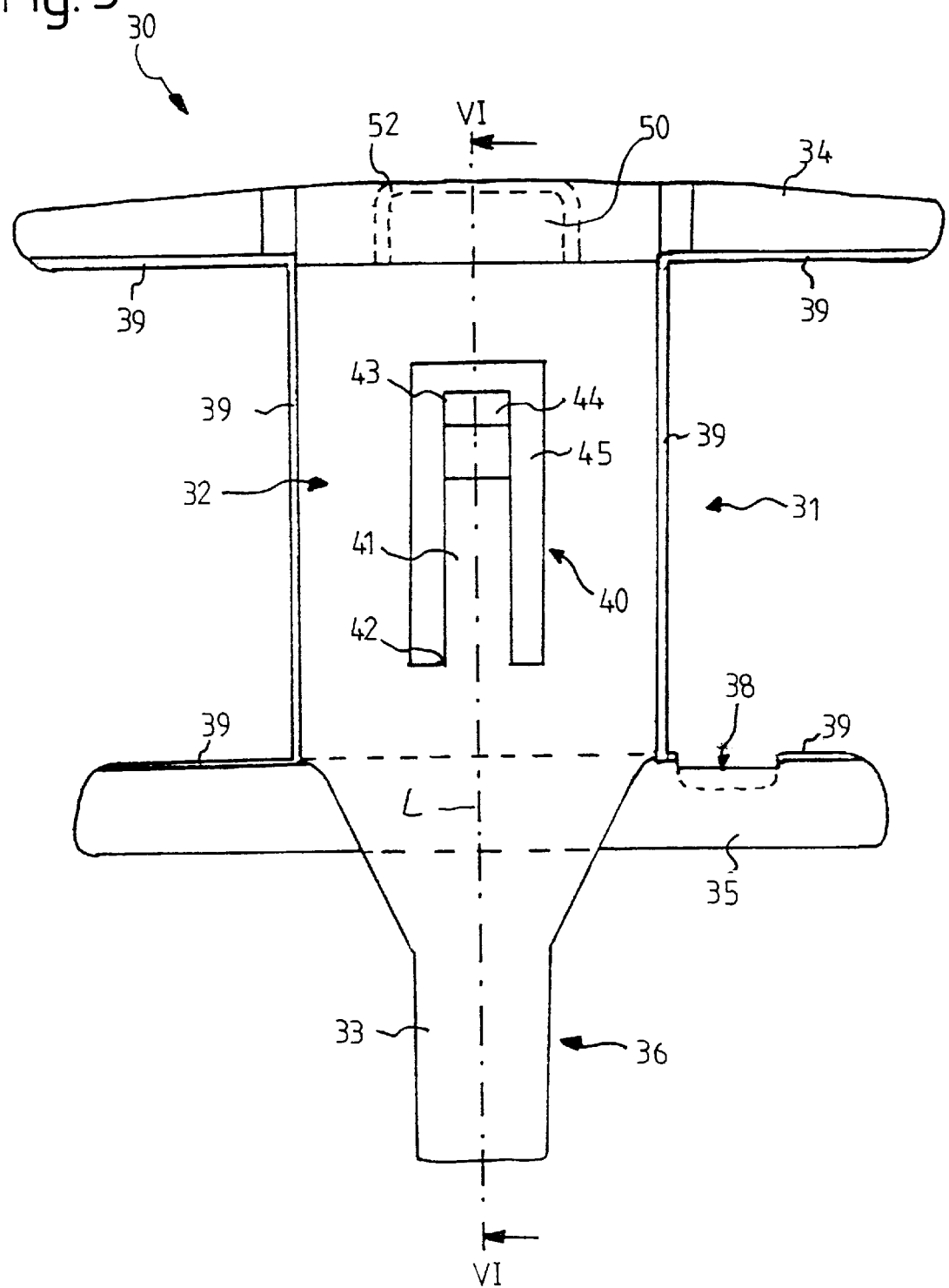
FIG. 5 is a schematic view from the bottom of a winding body according to the invention.

In order to be able to wire the winding ends 16 of the individual windings 13 in a simple manner, a connection device 70 is provided which is formed in the present example from three connecting rings 71, 72, 73. The individual ends 16 of the windings 13 are connected, for example, soldered, with the respective required connecting rings. Further, the corresponding connecting ring is connected with a lead connection 15 shown in FIG. 1. In order to guide the winding ends 16 away from the windings 13 in a defined manner, suitable slots 38, in which the winding ends 16 are inserted, are provided in the leg 30 of the winding body 35 as is shown in FIG. 5.

To hold the connecting rings 71, 72, 73 in a space-saving yet secure manner in spatial proximity to the windings 13, the winding body 30 has a corresponding receiving area 36 for the connection device 70 and connecting rings 71, 72, 73. The receiving area 36 is formed by the leg 35 and an extension 33 of the winding carrier 32 projecting axially beyond this leg 35. Further, a fixing leg 60 is provided at a distance from the leg 35 in axial direction L and is connected with the winding carrier 32. The fixing leg 60 is oriented perpendicular to the winding carrier 32, so that an essentially U-shaped receiving area 36 is provided. In order to fix the connecting rings 71, 72, 73 in such a way that the connecting rings are prevented from slipping out of the receiving area 36 unintentionally, the fixing leg 60 has, at its free end 61 located opposite to the end by which it is connected with the winding carrier 32, a holding element 62 constructed as a lug projecting into the receiving area 36. In this way, the connecting rings 71, 72, 73 can be introduced into the receiving area 36 in a simple manner.

For this purpose, the fixing leg 60 is first pressed outward, so that the receiving area 36 is enlarged. Because of the spring principle and the restoring forces which take effect, the fixing leg 36 tends to return to its starting position. When the connection device 70 has been introduced into the receiving area 36 and the fixing leg 60 has been released, the latter moves back to its starting position, so that the receiving area 36 is reduced in such a way that the connecting rings 71, 72, 73 are closely confined in the receiving area 36. Further, the holding element 62 projects over the outer connecting ring 73, so that a further fixing of the connection device 70 is made possible.

A series of cutouts 37 are formed in one of the legs 34 in FIG. 3 so that the entire coil 25 and its individual components can be fixed relative to one another and to the yoke 21.

The winding body 30 is fastened to the winding tooth 24 via a locking device 40. This is illustrated with reference to FIGS. 4 to 6. As can be seen particularly from FIGS. 5 and 6, the locking device 40 has a locking plate 41 formed as a resilient tongue which is arranged inside a cutout 45 so as to pivot. The locking plate 41 is connected by one of its ends 42 directly to the winding carrier 32. At its free end 43, which is located opposite to fixed end 42, the locking plate 41 has a locking lug 44. The locking lug 44 extends beyond the outer surface 80 of the winding carrier 32 as can be seen particularly from FIG. 6.

In order to fasten the winding body 30 to the winding tooth 24, the locking device 40 is brought into contact with a corresponding receiving device constructed in the form of a recess 27 which is provided at the end side 26 of the winding tooth 24. When the winding body 30 is fastened to the winding tooth 24, the locking plate 41 with the locking lug 44 bands until the locking lug 44 lies in a plane with the outer surface 80 of the winding body 30. Because of the resilience of the locking plate 41, this locking plate 41 returns to its starting position recess 27. The locking lug 44 can snap into the recess 27, so that there is a secure and fixed connection between the winding body 30 and the winding tooth 24. This prevents the winding body 30 and winding 13 from slipping outward from the winding teeth 24 in radial direction with respect to the yoke 21.

Figure 6:
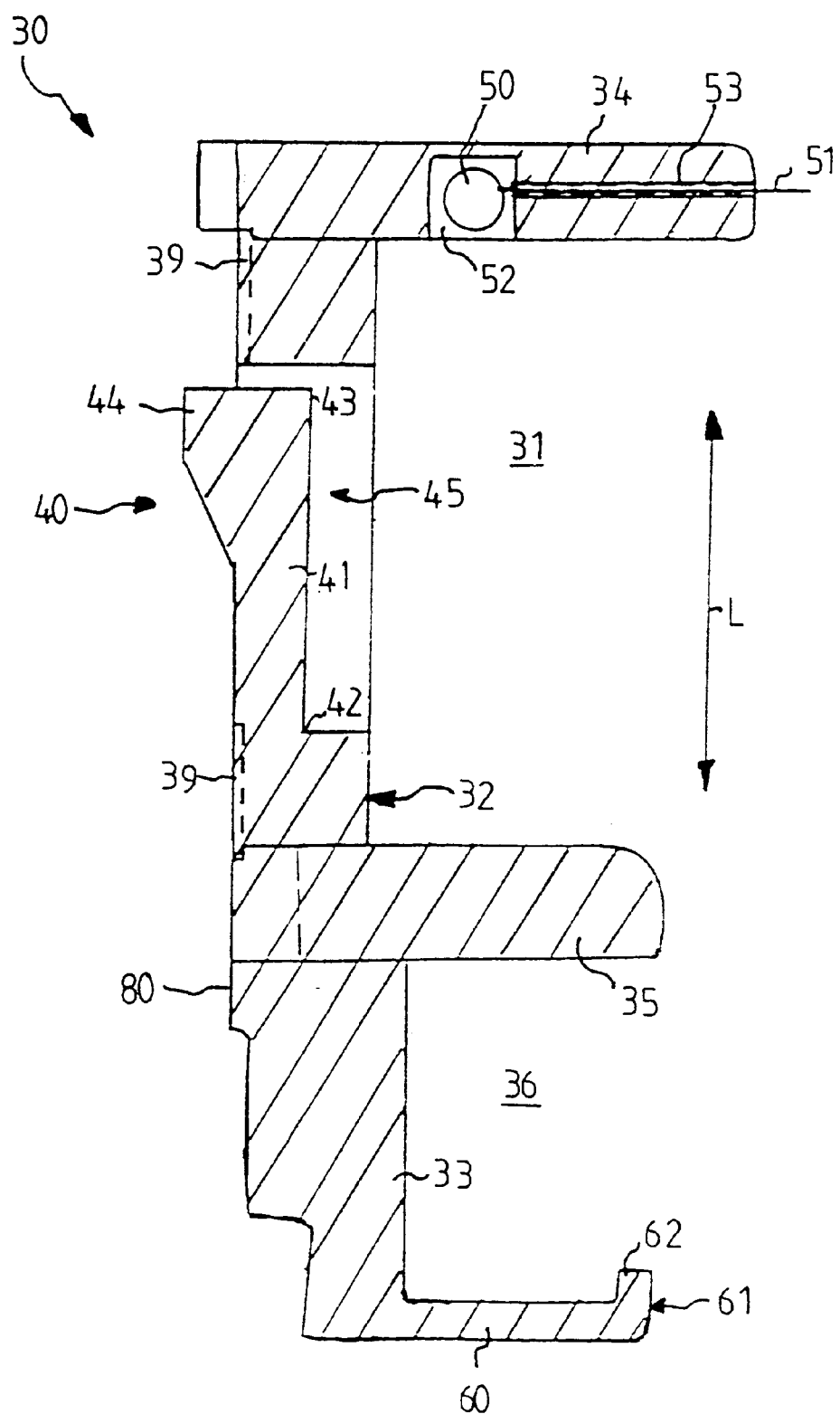
FIG. 6 is a schematic sectional view of the winding body along section line VI—VI from FIG. 5.

In the production of windings 13, it is further required that they be enclosed by a suitable insulating layer, for example, a slot insulating paper. This paper must be placed into the winding body 30 already at the start of the winding process and must be held by the winding body 30 during the winding process. For this purpose, the winding carrier 32 and/or at least one of the legs 34 or 35 can have at least one recess 39. These recesses which are shown in FIGS. 5 and 6 serve to hold the insulating layer. In the present embodiment example, the recesses in the edge areas (edges) of the winding carrier 32 and legs 34, 35 are constructed in the form of step-like projections or shoulders. The height of the steps is selected in such a way that they correspond approximately to the thickness of the insulation layer. As a result of the step-like construction of the recess 39, it is achieved, for one, that the insulation layer can be held by the winding bodies 30 and will not slip during the winding process. Further, the insulation layer does not project beyond the legs 34, 35 or winding carrier 32 during the winding process, so that tilting or the like is prevented.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. Winding body for receiving a winding for an electromagnetomechanical converter with a winding area for the winding, which winding area is formed by a winding carrier and two legs which define the winding area in axial direction and are connected with the winding carrier, said winding body being injection molded plastic and further comprising a temperature sensor molded in the winding body for measuring the temperature in a winding.

2. Winding body for receiving a winding for an electromagnetomechanical converter with a winding area for the winding, which winding area is formed by a winding carrier and two legs which define the winding area in axial direction and are connected with the winding carrier, said winding carrier having an extension extending axially beyond one of said legs, said winding body further comprising a fixing leg connected to said extension and axially spaced from said one of said legs to form a receiving area for a connection device for the winding.

3. Winding carrier according to claim 2 wherein the winding carrier has a locking device for locking the winding body at a winding tooth.

4. Winding body according to claim 2 wherein a temperature sensor for measuring the temperature in the coil is provided in the winding body.

5. Winding body according to claim 1 wherein the temperature sensor is arranged in one of the legs.

6. Winding body according to claim 5 further comprising ducts provided in the leg for receiving contacts of the temperature sensor.

7. Winding body according to claim 2 wherein the fixing leg has free end with a holding element which projects into the receiving area.

8. Electromagnetomechanical converter with a rotor and a stator, wherein the rotor or stator has at least one lamination stack with a yoke and a quantity of winding teeth for receiving windings, wherein every winding is wound on two winding bodies, each said winding body comprising a winding carrier and a pair of legs, which define a winding area therebetween, said carrier having a locking device for locking the winding body at a winding tooth and an extension extending axially beyond one of said legs, said winding body further comprising a fixing leg connected to said extension and axially spaced from said one of said legs to form a receiving area, said converter further comprising a connection device for each of the windings, said connection device being retained in said receiving area.

9. Electromagnetomechanical converter according to claim 8 wherein the winding bodies are arranged at end sides of the winding teeth.

10. Electromagnetomechanical converter according to claim 9 wherein each of the winding bodies is provided with a resilient tongue which engages a recess in each of the end sides of the winding teeth.

11. Electromagnetomechanical converter according to claim 8 wherein every winding is enclosed by an insulation layer.

12. Electromagnetomechanical converter according to claim 8 wherein every winding body is arranged at the end sides of the winding teeth in such a way that the receiving area for the connection device is constructed radially below the winding area for the winding viewed from the center of the yoke.

\* \* \* \* \*